(12) United States Patent
Lee et al.

(10) Patent No.: US 8,104,684 B2
(45) Date of Patent: Jan. 31, 2012

(54) BAR CODE MADE OF ELECTRONIC PAPER

(75) Inventors: Jae Chan Lee, Gyunggi-Do (KR); Yong Gil Namgung, Gyunggi-Do (KR); Hyun Hak Kim, Gyunggi-Do (KR); Seok Min Woo, Gyunggi-Do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 361 days.

(21) Appl. No.: 12/435,956

(22) Filed: May 5, 2009

(65) Prior Publication Data

US 2010/0108764 A1    May 6, 2010

(30) Foreign Application Priority Data

Oct. 31, 2008   (KR) .................. 10-2008-0108075

(51) Int. Cl.
   *G06K 7/10*   (2006.01)
   *C02F 1/40*   (2006.01)
   *G09G 3/34*   (2006.01)
   *G02B 26/00*   (2006.01)

(52) U.S. Cl. ............... 235/462.01; 204/600; 359/296; 345/107

(58) Field of Classification Search ........... 235/462.01–462.49; 345/107; 359/296; 204/600
See application file for complete search history.

(56) References Cited

U.S. PATENT DOCUMENTS

| | | | |
|---|---|---|---|
| 2003/0207023 A1* | 11/2003 | Soni et al. | 427/58 |
| 2004/0169912 A1* | 9/2004 | Liang et al. | 359/296 |
| 2005/0237204 A1* | 10/2005 | Burman et al. | 340/572.8 |
| 2006/0279527 A1* | 12/2006 | Zehner et al. | 345/107 |
| 2007/0024551 A1 | 2/2007 | Gelbman | |
| 2009/0039169 A1* | 2/2009 | Gelbman | 235/492 |

FOREIGN PATENT DOCUMENTS

| | | |
|---|---|---|
| JP | 2008-073081 A | 4/2008 |
| WO | 2008114396 A1 | 9/2008 |

OTHER PUBLICATIONS

UK Intellectual Property Office Combined Search and Examination Report issued Sep. 18, 2009.

* cited by examiner

*Primary Examiner* — Michael G Lee
*Assistant Examiner* — Laura Gudorf
(74) *Attorney, Agent, or Firm* — Lowe, Hauptman, Ham & Berner, LLP

(57) ABSTRACT

There is provided a bar code made of electronic paper. A bar code made of electronic paper according to an aspect of the invention may include: one or more e-paper stacks having a plurality of pieces of e-paper each having an entire surface displaying black, white or being transparent, wherein an upper level of e-paper of the e-paper stack is narrower than a lower level of e-paper thereof, the outermost layer of e-paper of the e-paper stack has the same width as the narrowest constituting a bar code, and part of the lower level of e-paper exposed by the upper level of e-paper adjacent to the lower level of e-paper has the same width as the narrowest constituent bar of the bar code.

3 Claims, 5 Drawing Sheets

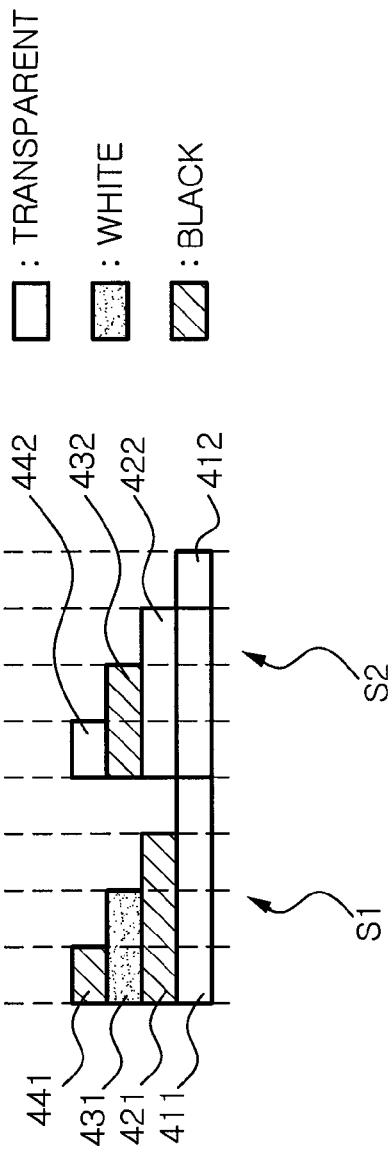
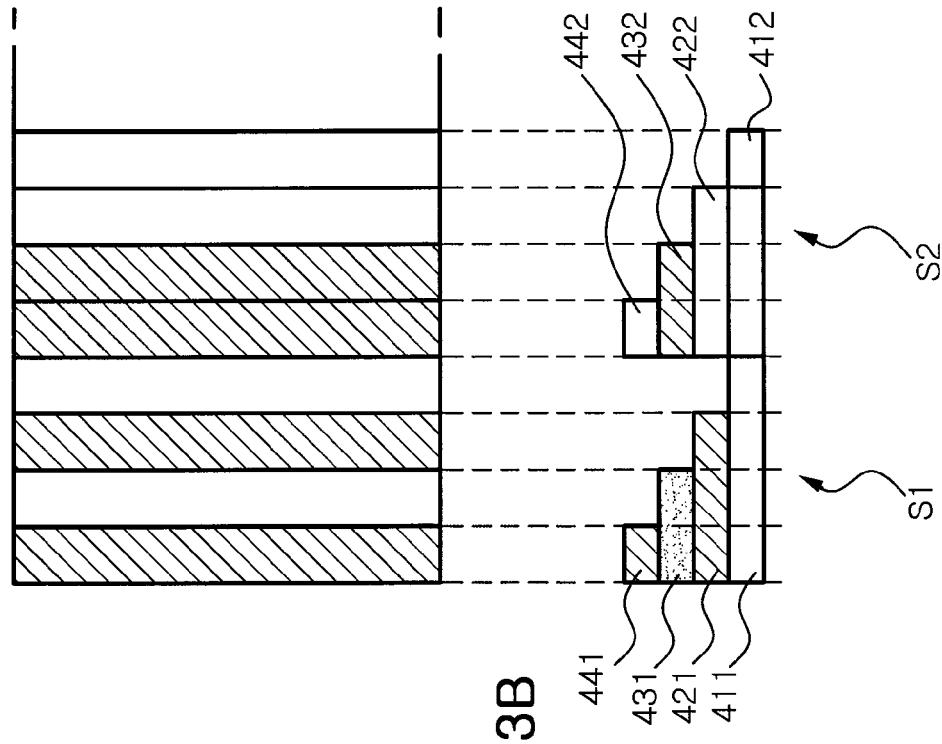
FIG. 3A
FIG. 3B

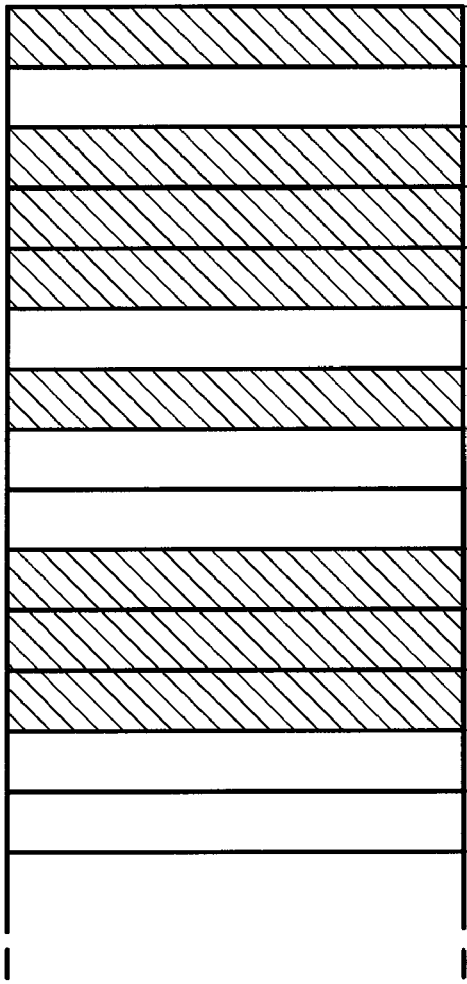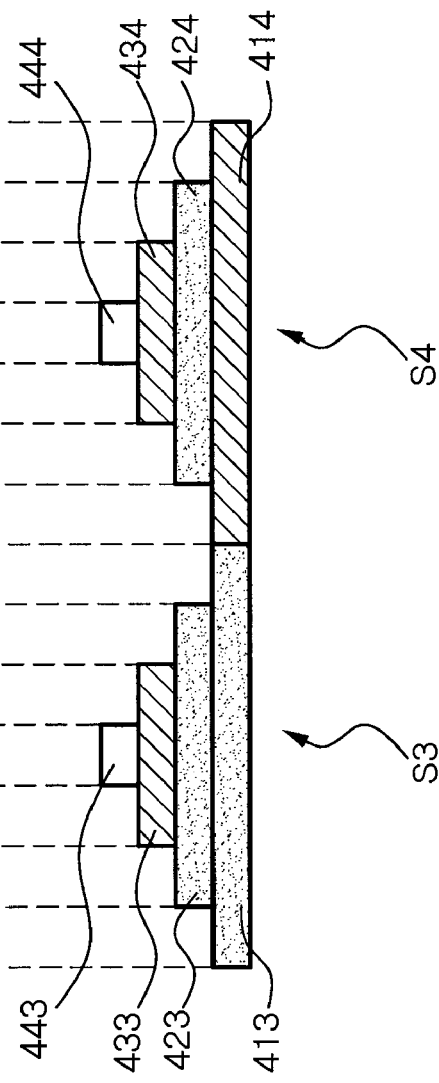

BAR CODE MADE OF ELECTRONIC PAPER

CROSS-REFERENCE TO RELATED APPLICATIONS

This application claims the priority of Korean Patent Application No. 2008-0108075 filed on Oct. 31, 2008, in the Korean Intellectual Property Office, the disclosure of which is incorporated herein by reference.

BACKGROUND OF THE INVENTION

1. Field of the Invention

The present invention relates to a bar code consisting of a plurality of bars coded with product information, and more particularly, to a bar code made of a plurality of pieces of electronic paper.

2. Description of the Related Art

In general, as the number of large stores has significantly increased, there is an increasing demand for an electronic shelf label (ESL) system that electronically manages labels displaying product information on store shelves for products to be placed on.

In general, shelf labels include pieces of information, such as product names, prices and barcodes containing product information, which are printed on paper and then attached to shelves. However, labels need to be printed out and attached again whenever a product's price is changed. If a product is moved to another shelf, a label is also printed out and attached to the shelf.

In order to avoid these inconveniences, electronic shelf labels (hereinafter, also referred to as "electronic labels") have been developed. An electronic shelf label includes a communication unit that receives data containing product information and a display unit that visually displays product data. When information changes occur, for example, a price is changed, the electronic shelf label can be changed almost in real time. A management unit that manages the entirety of electronic labels in stores is used to correct the contents of the electronic shelf labels in stores almost at the same time.

A liquid crystal display or electronic paper may be used as the display unit of the electronic label. In order to implement a bar code in a display unit using electronic paper, a plurality of parallel and narrow electrodes, each of which corresponds to one bar of a bar code, need to be provided on electronic paper. Further, a driving voltage needs to be applied to each of the plurality of electrodes to determine the color of each electrode. Since the plurality of electrodes are provided within a very small area and a driving voltage for driving the electrodes needs to be applied, it is difficult to physically implement a bar code on electronic paper. Furthermore, a driving voltage, applied to each of the plurality of electrodes, needs to be adjusted according to changes, the control process becomes complicated.

SUMMARY OF THE INVENTION

An aspect of the present invention provides a bar code made of electronic paper that can reduce the difficulty in producing a bar code and the complexity of driving a bar code.

According to an aspect of the present invention, there is provided a bar code made of e-paper, the bar code including: one or more e-paper stacks having a plurality of pieces of e-paper each having an entire surface displaying black, white or being transparent, wherein an upper level of e-paper of the e-paper stack is narrower than a lower level of e-paper thereof, the outermost layer of e-paper of the e-paper stack has the same width as the narrowest constituent bar of a bar code, and part of the lower level of e-paper exposed by the upper level of e-paper adjacent to the lower level of e-paper has the same width as the narrowest constituent bar of the bar code.

The e-paper stacks may be connected in a widthwise direction of the plurality of pieces of e-paper.

The plurality of pieces of e-paper of the e-paper stack may be stacked so that edges thereof coincide with each other at one side in a widthwise direction.

The plurality of pieces of e-paper of the e-paper stack may be stacked so that centers thereof coincide with each other in a widthwise direction.

BRIEF DESCRIPTION OF THE DRAWINGS

The above and other aspects, features and other advantages of the present invention will be more clearly understood from the following detailed description taken in conjunction with the accompanying drawings, in which:

FIG. 3A is a plan view illustrating a bar code according to an exemplary embodiment of the present invention;

FIG. 3B is a side view illustrating the bar code, shown in FIG. 3A;

FIG. 5A is a plan view illustrating a bar code according to another exemplary embodiment of the present invention; and FIG. 5B is a side view illustrating the bar code, shown in FIG. 5A.

DETAILED DESCRIPTION OF THE PREFERRED EMBODIMENT

Figure 1:
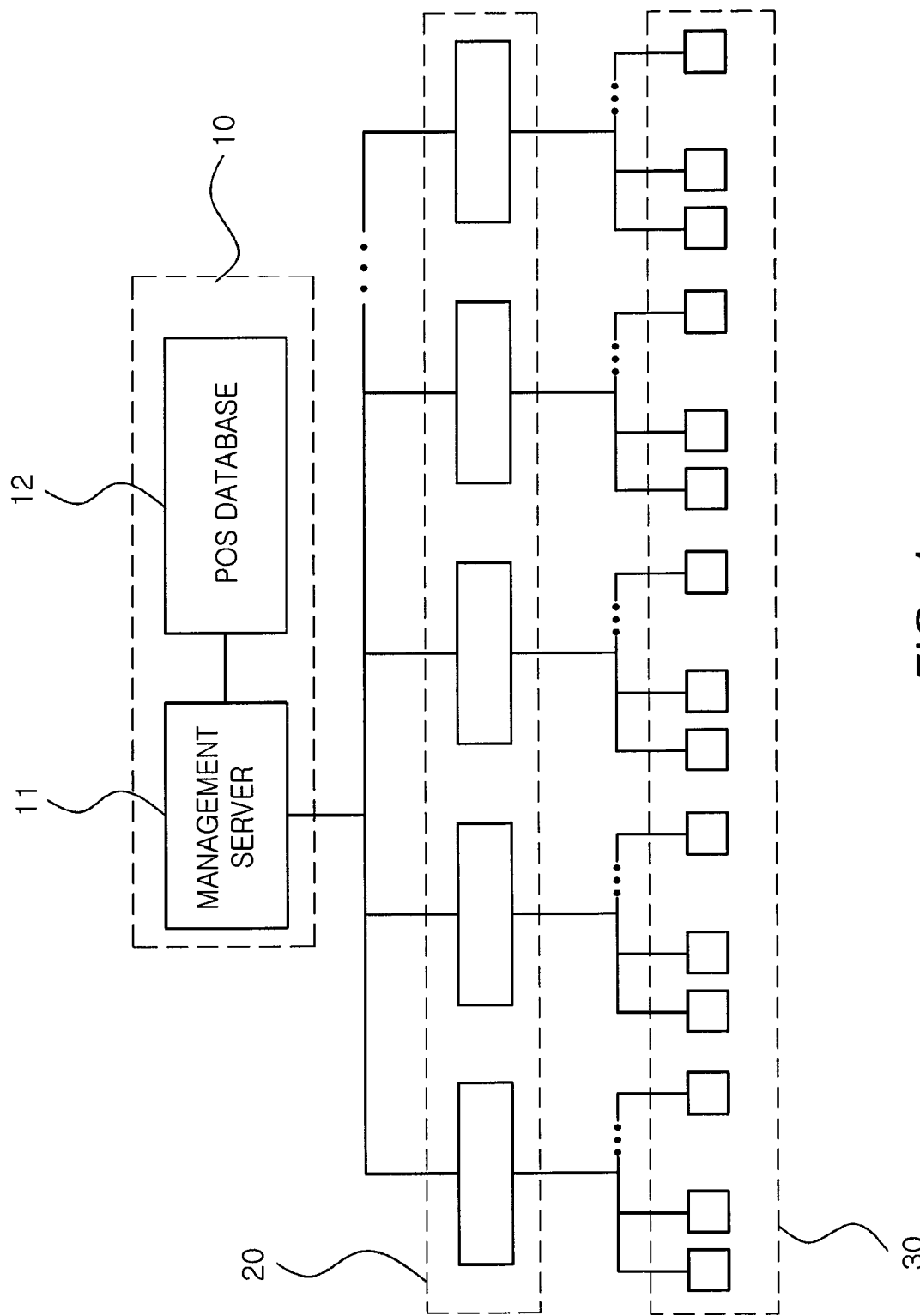
FIG. 1 is a view illustrating a configuration of a system operating an electronic shelf label to which the present invention is applied.

Exemplary embodiments of the present invention will now be described in detail with reference to the accompanying drawings. The invention may however be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity.

Figure 2:
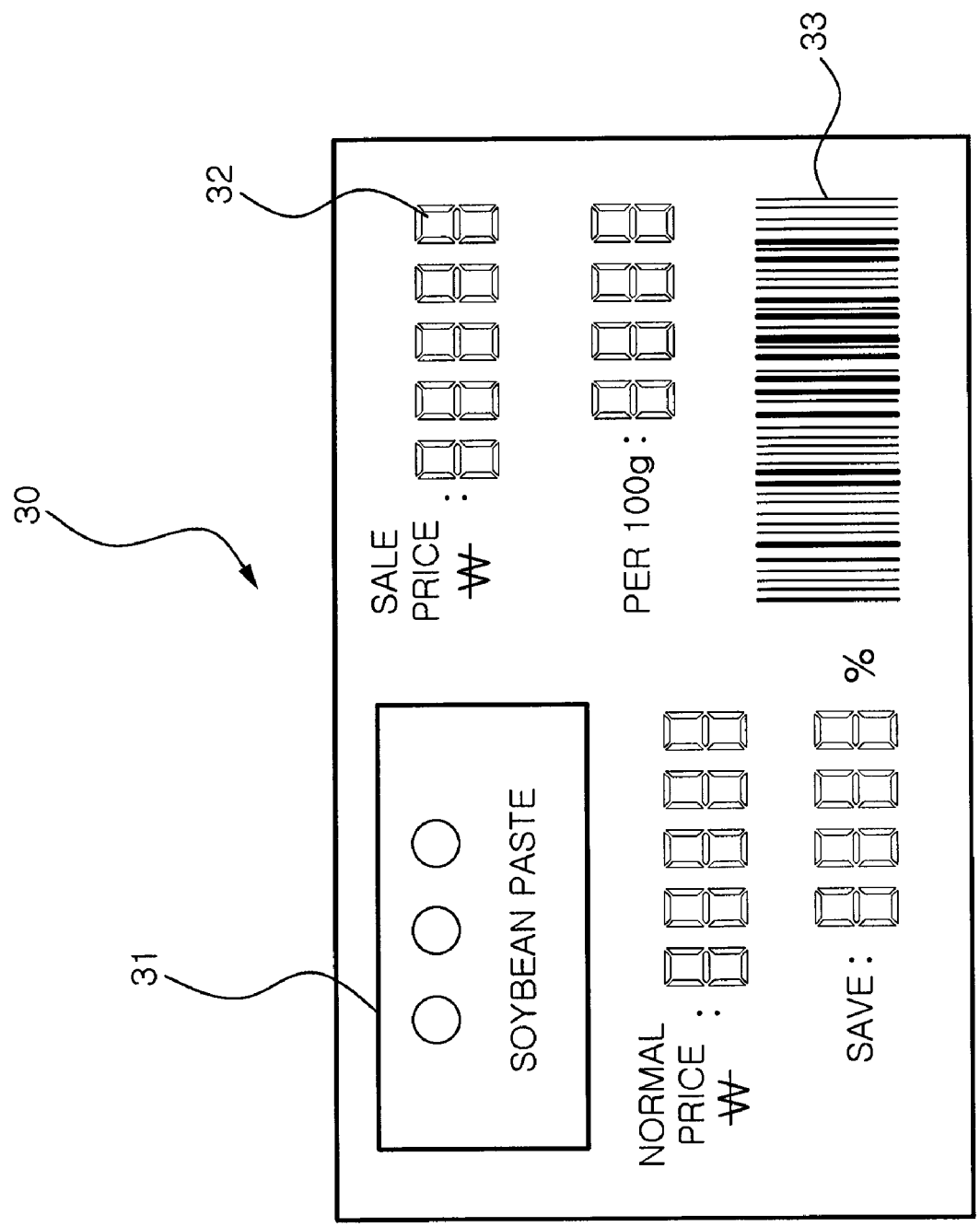
FIG. 2 is a view illustrating an example of an electronic shelf label to which the present invention is applied.

FIG. 1 is a view showing a configuration of a system that operates an electronic shelf label to which the present invention is applied. FIG. 2 is a view illustrating one example of an electronic shelf label to which the present invention is applied.

As shown in FIG. 1, a system that operates an electronic shelf label (ESL) to which an embodiment of the invention is applied may include a product information management part 10, a sink device part 20 and an electronic shelf label part 30.

The product information management part 10 may include a management server 11 and a POS database 12. The management server 11 stores product information, such as the prices of products that are displayed in a store. When this product information is changed and thus the contents, shown on electronic labels, are subject to changes, the management server 11 transmits data containing the changed product information. The management server 11 is connected to a POS (Point Of Sale) system (not shown) to obtain sales-related information on products in a store in real time.

The sink device part 20 includes a plurality of sink devices that receive data containing product information from the management server 11 and transmit the received data to a plurality of electronic shelf labels. For example, each of the sink devices is connected to the management server 11 over a wired/wireless LAN to receive data containing product information from the management server 11 via TCP/IP. Further, each of the sink devices can perform wireless communications with the plurality of electronic shelf labels by partially using a communication method defined by ZigBee in order to transmit the data containing product information to the plurality of electronic shelf labels at the same time. Each of the sink devices of the sink device part 20 may include a receiver that receives data from the management server 11, such as a wired/wireless LAN receiver, and a transmitter that transmits data to the plurality of electronic shelf labels, such as a ZigBee transmitter.

The electronic shelf label part 30 includes the plurality of electronic shelf labels that display product information and are attached to display stands in a store. Each of the electronic shelf labels may include a small display panel, such as a black-and-white or color LCD or electronic paper (e-paper), and a transceiver that performs wireless communication with the sink device part 20. Each of the electronic shelf labels may perform wireless communication by a wake-up method that periodically turns the power of the transceiver on or off. That is, when there is no message from the sink device part 20, the power of the transceiver of the sink device is periodically turned on or off to check whether there is any message for the transceiver to receive. When there is a message for the sink device to send to the electronic shelf label, the sink device transmits a wake up signal when the sink device is turned on. When the electronic shelf label receives the wake up signal, the electronic shelf label does not turn off the transceiver but maintains an ON-state so as to receive the data containing product information that is transmitted after the wake up signal has been sent. The electronic shelf label can reduce the amount of power being consumed for the communications of the sink device by the wake-up method.

One electronic shelf label included in the electronic shelf label part 30 can be displayed as shown in FIG. 2, for example. As shown in FIG. 2, the electronic shelf label 30 may include an area 31 on which a product name is shown, an area 32 on which various pieces of price information are shown, and an area 33 on which a bar code of the corresponding product is shown.

The invention is characterized by implementing the bar code showing area of the electronic shelf label 30 by e-paper.

FIG. 3A is a plan view illustrating a bar code according to an exemplary embodiment of the invention. FIG. 3B is a side view illustrating the bar code, shown in FIG. 3A. As shown in FIGS. 3A and 3B, a bar code according to this embodiment includes one or more e-paper stacks S1 and S2. The e-paper stack S1 may include four pieces of e-paper 411, 421, 431 and 441 each of whose entire surface appears black, white or being transparent according to a driving voltage being applied. In the same manner, the e-paper stack S2 may include four pieces of e-paper 412, 422, 432 and 442.

In each of the e-paper stacks S1 and S2, the layer of upper electronic paper is narrower than the layer of lower electronic paper to expose part of the lower electronic paper.

The outermost pieces of e-paper 441 and 442 of the e-paper stacks S1 and S2 have the same width as the narrowest constituent bar of a bar code.

Furthermore, part of lower electronic paper that is exposed by upper electronic paper, placed directly above the lower electronic paper, has the same width as the narrowest constituent bar of the above bar code.

In particular, the bar code, shown in FIGS. 3A and 3B, the four pieces of e-paper 411, 421, 431 and 441 of the e-paper stack S1 and the four pieces of e-paper 412, 422, 432 and 442 of the e-paper stack S2 are stacked so that side surfaces thereof coincide with each other at one side in a widthwise direction (so that the edges on the left side coincide with each other vertically in FIGS. 3A and 3B).

Figure 4:
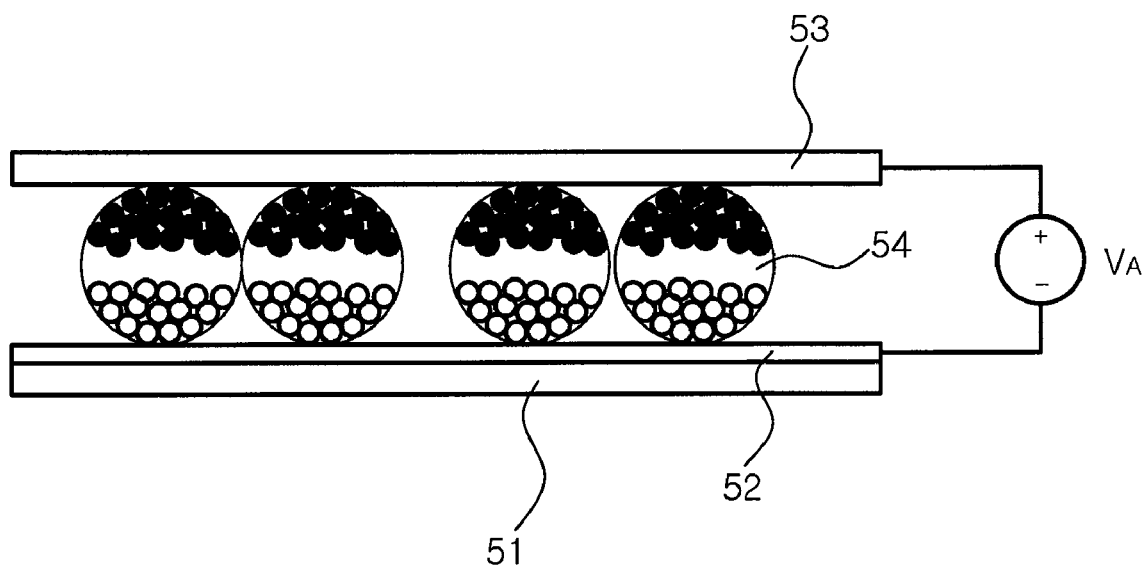
FIG. 4 is a view illustrating a configuration of an example of electronic paper that is applied to an exemplary embodiment of the present invention.

FIG. 4 is a view illustrating a configuration of an example of e-paper that is applied to an embodiment of the invention. As shown in FIG. 4, e-paper includes a transparent substrate 51, a first transparent electrode 52 and a second transparent electrode 53 that are sequentially formed on the transparent substrate 51, and variable color inks 54 that are injected between the first and second transparent electrodes 52 and 53. The color of the upper part of the e-paper varies from black, white or transparent, as the arrangement of color particles within the variable color ink 54 has a predetermined orientation according to the magnitude of driving voltage $V_A$ applied between the two electrodes. This color variation according to the driving voltage may be realized in various manners according to e-paper manufacturers or the kind of ink being used.

Referring to FIG. 3, in the bar code according to this embodiment, the e-paper stack S1 includes the four pieces of e-paper 411, 421, 431 and 441, and the e-paper stack S2 includes the four pieces of e-paper 412, 422, 432 and 442. The first electrode, as shown in FIG. 4, covers almost the entire surface of the substrate of each layer of e-paper, so that the entire surface of the e-paper displays color. In particular, in FIG. 3, the pieces of e-paper are stacked while the edges thereof coincide with each other on the left, and the outermost layer of electronic paper has the same width as the narrowest constituent bar of the bar code to be displayed. Furthermore, like the width of the outermost layer, the area of the lower layer that is exposed by the upper layer adjacent to the lower layer has the same width as the narrowest bar of the bar code to be displayed.

A driving voltage is appropriately applied to each layer of e-paper to thereby form a bar code having various patterns. For example, in order to implement the narrowest bar on the farthest left, a driving voltage is appropriately applied to the outermost layer of e-paper 441 which therefore displays black. At the same time, a driving voltage is applied to each layer of e-paper so that the remaining pieces of e-paper 411, 421 and 431 all display white or the e-paper 411 displays white and the remaining pieces of e-paper 421 and 431 become transparent.

As described above, according to the embodiment, illustrated in FIG. 3, since e-paper having a relatively large width is used, a process of forming electrodes to implement continuous bars having the least width when manufacturing a bar code or a detailed process to prevent an electrical short circuit between electrodes is not required.

FIG. 5A is a plan view illustrating a bar code according to another exemplary embodiment of the invention. FIG. 5B is a side view illustrating the bar code, shown in FIG. 5A. Like the embodiment, illustrated in FIGS. 3A and 3B, in this embodiment, illustrated in FIGS. 5A and 5B, may include e-paper stacks S3 and S4. The e-paper stack S3 includes a plurality of pieces of e-paper 413, 423, 433 and 443, and the e-paper stack S4 includes a plurality of pieces of e-paper 414, 424, 434 and 444.

In each of the e-paper stacks S3 and S4, an upper level of e-paper is narrower than a lower level of e-paper, such that part of the lower level of e-paper is exposed to the upper side. In particular, in this embodiment, shown in FIGS. 5A and 5B, the plurality of pieces of e-paper in each of the e-paper stacks S3 and S4 are stacked so that the centers thereof coincide with each other in a widthwise direction, and both sides of the lower level of e-paper are exposed on the basis of the upper level of e-paper along the widthwise direction.

In the same manner as the embodiment, illustrated in FIGS. 3A and 3B, the outermost pieces of e-paper 443 and 444 of the e-paper stacks S3 and S4 have the same width as the narrowest constituent bar of a bar code.

Furthermore, parts of a lower level of e-paper that are exposed by an upper level of e-paper placed right above the lower level of e-paper have the same width as the narrowest constituent bar of the above-described bar code.

In the bar code according to this embodiment, the e-paper stack S3 includes the four pieces of e-paper 413, 423, 433 and 443, and the e-paper stack S4 includes the four pieces of e-paper 414, 424, 434 and 444. The first electrode, as shown in FIG. 4, covers almost the entire surface of the e-paper so that the entire surface of the e-paper displays color. In particular, in FIG. 5, the pieces of e-paper are stacked while the centers thereof in the widthwise direction coincide with each other, so that both sides of the lower level of e-paper are exposed on the basis of the upper level of e-paper in the widthwise direction. The outermost layers of e-paper 443 and 444 have the same width as the narrowest bar of the bar code to be displayed. Further, each side of the lower level of e-paper has the same width as the narrowest bar of the bar code to the displayed in the same manner as the width of the outermost layers of e-paper.

Then, a driving voltage is appropriately applied to each layer of e-paper to thereby form a bar code having various patterns. For example, in order to implement the narrowest bar, a driving voltage is appropriately applied to the outermost layer of e-paper 443 which therefore displays black, while driving voltages may be applied so that the remaining pieces of lower level of e-paper 413, 423 and 433 all display white or the e-paper 413 displays white and the remaining pieces of e-paper 423 and 433 become transparent. Further, in order to implement two continuous bars, driving voltages are supplied so that two layers of lower e-paper (for example, 413 and 423) display black and an upper level of e-paper (for example, 433) displays white.

As described above, according to this embodiment, shown in FIGS. 5A and 5B, a detailed process is not required like the embodiment, shown in FIGS. 3A and 3B. Furthermore, since two bars can be implemented using one piece of e-paper, the number of driving voltages to implement bars can be reduced.

As set forth above, according to exemplary embodiments of the invention, a bar code having a plurality of bars can be simply implemented without any complicated process of elaborately forming electrodes on e-paper by a simplified structure in which a plurality of pieces of e-paper of varying widths are stacked. Further, according to exemplary embodiments of the invention, a bar code can be implemented by a smaller number of driving signals as compared to the number of driving signals required to drive individual bars constituting a bar code.

While the present invention has been shown and described in connection with the exemplary embodiments, it will be apparent to those skilled in the art that modifications and variations can be made without departing from the spirit and scope of the invention as defined by the appended claims.

What is claimed is:

1. A bar code made of e-paper, the bar code comprising:
one or more e-paper stacks having a plurality of pieces of e-paper each having an entire surface displaying black, white or being transparent,
wherein an upper level of e-paper of the e-paper stack is narrower than a lower level of e-paper thereof,
the outermost layer of e-paper of the e-paper stack has the same width as the narrowest constituent bar of the bar code, and
part of a lower level of e-paper exposed by a upper level of e-paper adjacent to the lower level of e-paper has the same width as the narrowest constituent bar of the bar code.

2. The bar code of claim 1, wherein the plurality of pieces of e-paper of the e-paper stack are stacked so that the edges of the pieces of e-paper coincide with each other at one side of the stack of e-paper.

3. The bar code of claim 1, wherein the plurality of pieces of e-paper of the e-paper stack are stacked so that the centers of the pieces of e-paper in the e-paper stack coincide with each other.

* * * * *